United States Patent
Inman et al.

(10) Patent No.: US 6,591,588 B2
(45) Date of Patent: Jul. 15, 2003

(54) CROP MATERIAL BAGGER HAVING CONVERTIBLE TUNNEL

(75) Inventors: Larry R. Inman, Warrenton, OR (US); Walter L. Jay, Tekamah, NE (US)

(73) Assignee: Ag-Bag International Limited, Warrenton, OR (US)

( * ) Notice: Subject to any disclaimer, the term of this patent is extended or adjusted under 35 U.S.C. 154(b) by 16 days.

(21) Appl. No.: 09/934,998

(22) Filed: Aug. 21, 2001

(65) Prior Publication Data

US 2003/0037517 A1 Feb. 27, 2003

(51) Int. Cl.[7] .............................. B65B 9/15; B65B 39/06
(52) U.S. Cl. ................. 53/576; 53/201; 53/257
(58) Field of Search .................. 53/201, 257, 567, 53/578; 100/65; 141/114

(56) References Cited

U.S. PATENT DOCUMENTS

| | | | | |
|---|---|---|---|---|
| 4,949,633 | A | * | 8/1990 | Johnson et al. ............... 100/65 |
| 5,127,212 | A | * | 7/1992 | Johnsen et al. ............... 53/540 |
| 5,419,102 | A |   | 5/1995 | Inman et al. |
| 5,421,142 | A |   | 6/1995 | Cullen |
| 5,628,168 | A | * | 5/1997 | Inman et al. ................. 53/576 |
| 6,220,001 | B1 | * | 4/2001 | Brodrecht .................... 53/567 |

* cited by examiner

Primary Examiner—John Sipos
(74) Attorney, Agent, or Firm—Robert L. Harrington; Schwabe Williamson & Wyatt

(57) ABSTRACT

A bag filling machine having a tunnel and a bag fitted to the tunnel for transferring material compacted in the tunnel and in the compacted state, into the bag. The tunnel is composed of a bottom portion and alternating top portions that are alternatively and selectively secured to the bottom portion. Said top portion defining a portion of the circumferential rear end opening and having different circumferential end portions that adapt the tunnel to different bag sizes.

4 Claims, 2 Drawing Sheets

CROP MATERIAL BAGGER HAVING CONVERTIBLE TUNNEL

FIELD OF THE INVENTION

This invention relates to a bagging machine such as used for bagging and the like and more particularly to the convertibility of the machine for bagging into different sized bags.

BACKGROUND OF THE INVENTION

Bagging machines as contemplated by the present invention are used primarily (but not exclusively) for storage of farm crop materials. A major application is the storage of silage and other materials used for feeding farm animals. In many parts of the country, grass does not grow during the months from late fall to early spring and animal feed such as silage is harvested and stored during the summer and fall months and then removed piece meal for feeding cattle, e.g., dairy cows.

The bagging process requires that the crop material be tightly compressed in a heavy non-elastic bag so that there is minimal air and thus oxygen that is retained in the bag that can cause the crop to spoil during storage.

When it is necessary to remove the material from the bag for feeding the farm animals, one end of the bag is opened and then day by day a desired portion of the material is removed from the opened bag end and fed to the farm animals. Because the bag is now opened, the end of the material in the bag is exposed to the atmosphere/air (oxygen) and if allowed to be exposed for any length of time, the material in that end of the bag will spoil.

It has been learned that the way to avoid spoilage is to remove a sufficient depth of the material each day so that the material previously adjacent the opened end and which has been exposed to air is removed prior to spoilage and the fermenting or spoiling process starts anew with the newly exposed end portion of the material. The newly exposed material will be removed the following day before spoilage can take place and so on.

Of course that material which is removed needs to be fed to and eaten by the animals and it is the amount of material required for feeding the animals that dictates the amount of feed that is to be removed from the storage bag. It follows that the bag opening (diameter) is desirably matched to the amount of daily feed required. Thus, if it is determined that the air will penetrate into the material at the opened end of up to 10 inches and therefore at least 10 inches depth of material is desirably removed daily, and it is determined that the daily feed required for feeding the animals is one ton of that material, then the diameter of the bag needs to be no greater than that which will result in the daily removal of 10 inches depth of material without exceeding a ton of the material.

Bag sizes (diameter) typically are provided in one foot increments between six and twelve feet in diameter. Prior bagging machines when manufactured were provided with tunnels sized to fit a particular bag size. Thus, if a dairyman has a dairy herd that requires daily feeding of one ton of material, he determined the size of the bag he needed and accordingly acquired a bagging machine that accommodated that bag size.

BRIEF DESCRIPTION OF THE INVENTION

A problem that occurs is that a farmer/dairyman may have a requirement for more than one bag size. For example, he may want to feed a combination of feed material. He may wish to feed one ton of silage and one and one-half tons of alfalfa which require different bag sizes. In other instances he may want to feed alternating materials having different densities whereby the same one ton of material occupies different volumes. In order to accommodate the different bag sizes, the farmer was previously required to own multiple bagging machines.

The present invention provides the ability to convert the same bagging machine to different bag sizes. In brief, a tunnel may be sized to fit a 10 foot diameter bag size. This diameter bag has a circumference of about 31.4 feet. The tunnel circumference at the rear opening is not typically circular and somewhat wider than it is tall. Nevertheless, the circumference is substantially 31.4 feet and the flexible bag just fits over the tunnel end opening. The material that is first compressed in the tunnel and then forced into the bag substantially fills the entire bag cross section.

To convert the tunnel so as to fit a 9 foot bag, the circumference of the tunnel end opening needs to be about 28.3 feet in circumference. To achieve this, the approximate upper half or top of the tunnel is a bolt on section. By unbolting the upper half and replacing it with a tunnel top that has the same configuration in the horizontal plane but shorter in height, the overall circumference of the tunnel end opening is reduced. The replacement top is designed to fit directly onto the tunnel bottom and thus configured in that respect like the prior 10 foot tunnel top. The outer perimeter of the inverted U-shaped upper half of the mouth of the end opening is reduced by the difference in circumference between a 10 foot bag opening and a 9 foot bag opening or substantially by about 3.1 feet. Now a 9 foot bag will precisely fit the new tunnel configuration.

The invention and the benefits of the invention will be more fully appreciated upon reference to the following detailed description having reference to the accompanying drawings.

DETAILED DESCRIPTION OF THE PREFERRED EMBODIMENT

Figure 1:
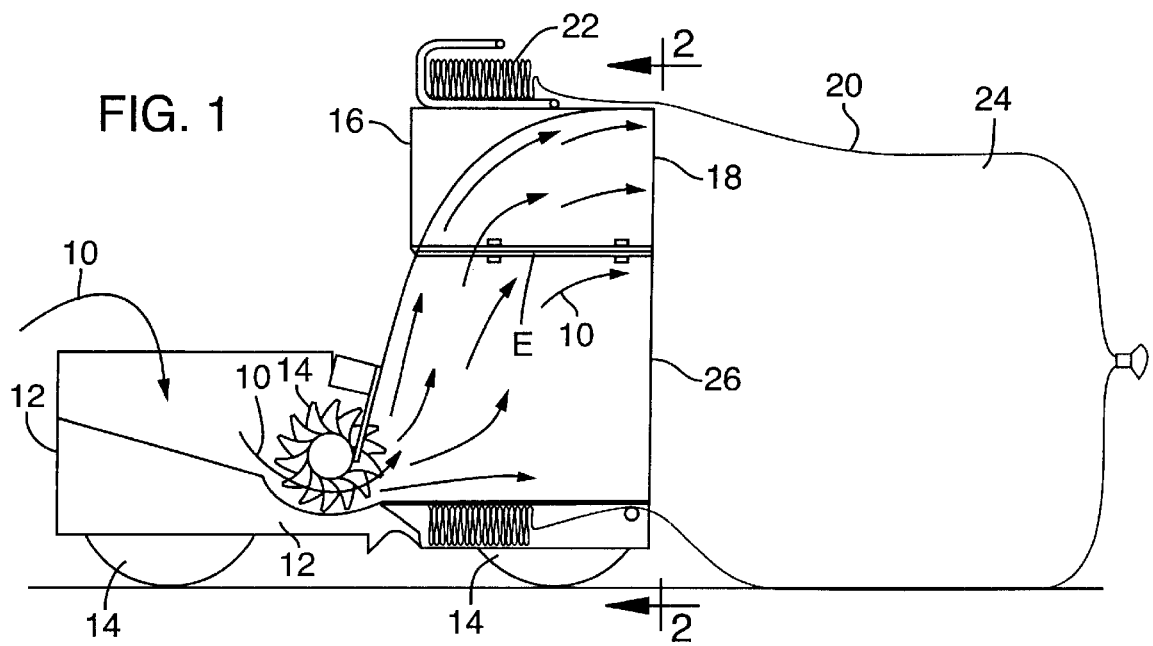
FIG. 1 schematically illustrates a bagging machine in the process of inserting feed material into a bag for which the present invention is contemplated.

FIG. 1 schematically illustrates a bagging machine, e.g., for bagging silage incorporating the present invention. Silage material indicated by arrow 10 is deposited in a hopper 12 forming part of the machine. The material 10 is force fed from the hopper by a rotor 14 and into a tunnel 16.

The tunnel 16 has an open end 18 at the rear of the tunnel and a bag 20 having a gathered portion 22 and a filled or deployed portion 24 mounted over the open end 18 to receive material 10. The material 10 is first compacted in the tunnel 16 and then shoved into the deployed portion of the bag due to the force feeding by the rotor 14. As the deployed portion becomes satisfactorily compacted in the bag portion 24 and because the bag portion is stationary, the back pressure created by the feed pressure of the rotor forces forward movement of the machine and deployment of an additional length of the bag from gathered portion 22 mounted on the tunnel.

It will be appreciated that it is important to completely (or nearly completely) fill the bag. This is accomplished by matching the cross section capacity of the tunnel 16 at the discharge or rear end opening 18 of the machine to the cross section capacity of the bag. This insures that throughout the filling process the material in the bag substantially is filled to its capacity. The bag 20 is substantially non-elastic in order to retain the desired compaction.

As explained in the Background of the Invention, it is desirable to use different sized bags (cross sectional circumference) depending on the desired material removal rate, i.e., the projected tonnage to be removed daily from the bag once the bag is opened. The invention is enabled by an appreciation that fitting the bag to the tunnel end does not require a particular cross section shape. The tunnel opening can be circular, oval shaped or a modified rectangular shape of varying dimensions. The flexibility of the bag allows the open end of the bag to conform to the tunnel shape. What is important is that the circumferential distance of the bag periphery substantially matches the periphery of the tunnel end opening.

Figure 2:
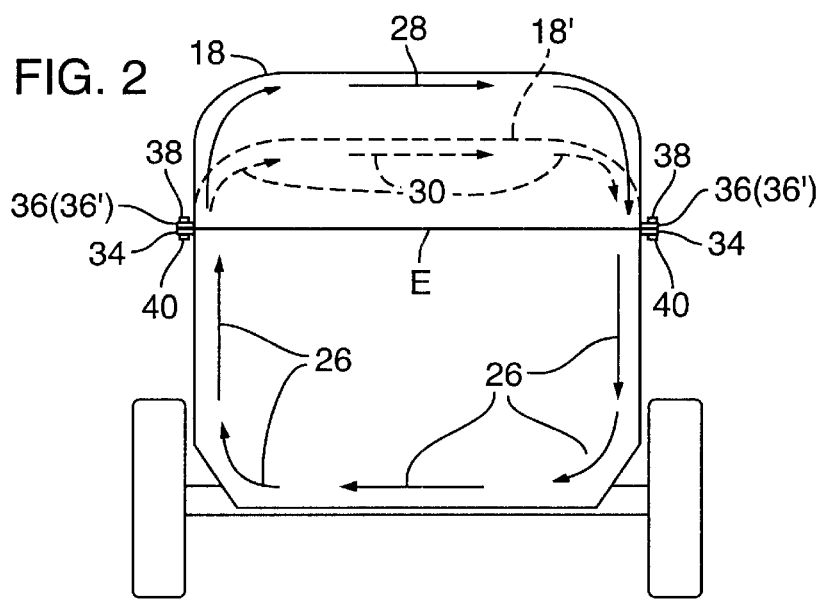
FIG. 2 is a view as if taken on view lines 2—2 of FIG. 1 and having replaceable tunnel top portions in accordance with the present invention.
Figure 3:
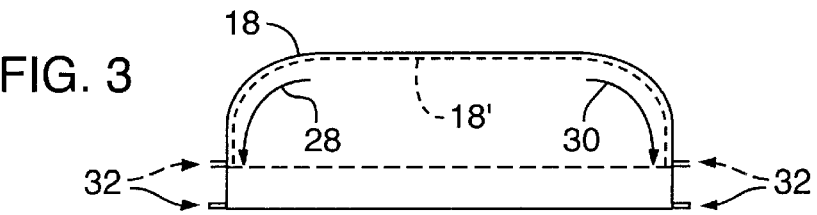
FIG. 3 is a comparison of alternative first and second tunnel top portions for the tunnel bottom of FIG. 2.

With reference to FIG. 2, two different rear end openings, 18 (solid line) and 18' (dash lines), are illustrated. Arrows 26 track a bottom end periphery that is common to both end openings 18 and 18'. Arrows 28 track the remaining periphery of end opening 18 and arrows 30 track the remaining periphery of end opening 18'. The difference in the peripheries 26, 28 and 26, 30 is illustrated in FIG. 3. The upper portions of the end openings 18 and 18' (which portions are tracked by arrows 28 and 30, respectively) are overlaid in FIG. 3 and have similar peripheries except for the portions designated by arrows 32. The portions 32 at the two sides, when added together, indicate the difference in the circumferential distance as between end opening 18 and end opening 18'.

EXAMPLES

It will be assumed that the two open ends, 18 and 18', are intended to fit bag sizes of 10 feet and 9 feet, respectively. The 10 foot bag has a periphery of about 31.4 feet and the 9 foot bag a periphery of 28.3 feet. Thus, periphery 26, 28 is similar to the 10 foot bag or about 31.4 feet and periphery 26, 30 similar to the 9 foot bag or about 28.3 feet. The difference is 3.1 feet which is the summation of distances 32 of FIG. 3.

The above relationship is developed for a preferred embodiment of the invention and, of course, the upper portions 28, 30 of ends 18 and 18' do not have to be similarly shaped as shown (the overlaid portions) except for the bottom lateral edge E. At bottom edge E in full cross section, both top portions are similarly configured and have the same lateral dimensions so that both upper portions similarly fit onto the top edge of bottom portion 26. The additional criteria is, of course, that whatever the configuration of the tunnel, periphery 26, 28 is 31.4 feet in total circumference and the periphery 26, 30 is 28.3 feet in circumferential distance.

Figure 4:
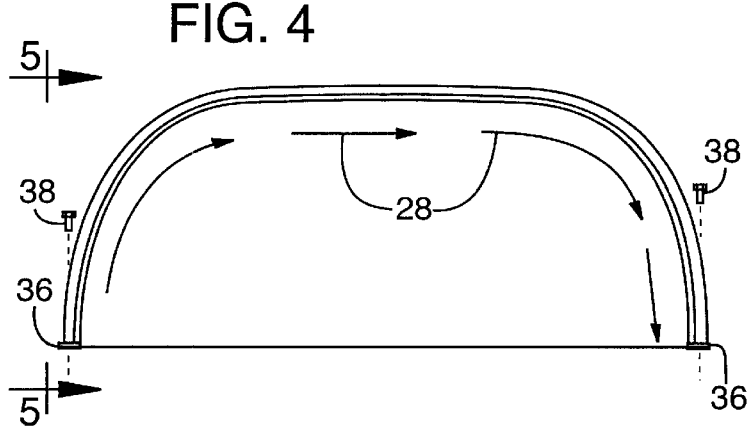
FIG. 4 is a rear end view of the first tunnel top portion.
Figure 5:
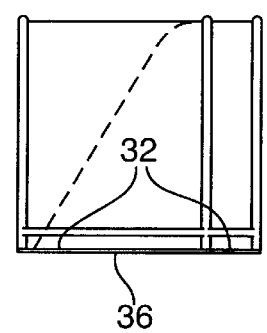
FIG. 5 is a side view as taken on view lines 5—5 of FIG. 4.
Figure 6:
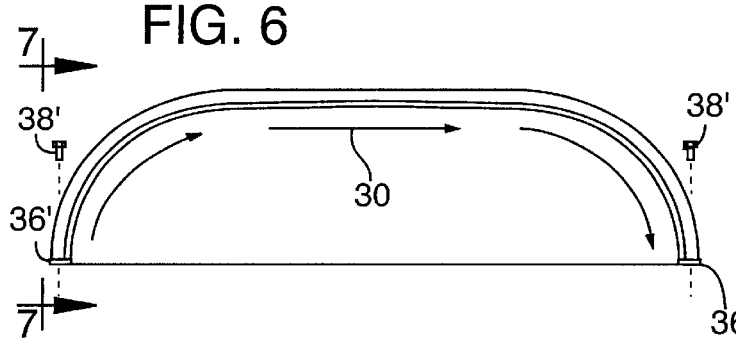
FIG. 6 is a rear end view of the second tunnel top portion.
Figure 7:
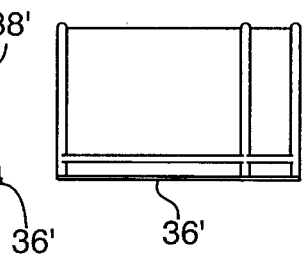
FIG. 7 is a side view as taken on view lines 7—7 of FIG. 6.
Figure 8:
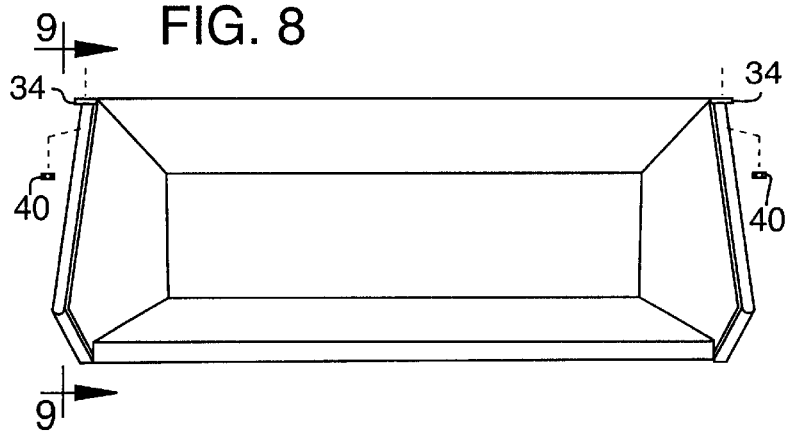
FIG. 8 is a rear view of a tunnel bottom portion.
Figure 9:
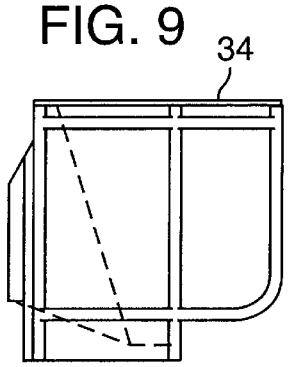
FIG. 9 is a side view of the tunnel bottom portion as taken on view lines 9—9 of FIG. 8.

Reference is now made to FIGS. 4–9. FIGS. 8 and 9 are rear and side views, respectively, of a bottom portion of the tunnel, i.e., that portion permanently affixed to the bagging machine and indicated by arrows 26 in FIG. 2. Extended laterally from the top side edges of the bottom section are flanges 34. FIGS. 4 and 5 illustrate the larger top tunnel portions having peripheries 28 and including flanges 36. With the top tunnel portion fitted in place to the lower tunnel portion, flanges 34, 36 are aligned including bolt holes through the flanges, and bolts 38 (FIG. 4) are inserted through the flanges 34, 36 and secured by nuts 40 (FIG. 8) to thereby clamp the tunnel portions together.

The tunnel when fitted with the larger top tunnel portion is accordingly adapted to receive a 10 foot bag and when a 9 foot bag is preferred, the bolts 38 are removed and the smaller top tunnel portion of FIGS. 6 and 7 is fitted to the bottom tunnel portion with flanges 36' aligned with flanges 34 of the bottom section (FIGS. 8 and 9). The bolts 38' are inserted through the flange openings and the tunnel is now adapted to receive a 9 foot bag.

It will be appreciated that the concept of tunnel conversion explained above can be applied to other sizes, i.e., converting the tunnel to fit a 9 foot or 8 foot bag, a 7 foot or 8 foot bag or even three or more bag sizes, i.e., a 9 foot standard tunnel shape being enlarged to fit a 10 foot bag and reduced to fit an 8 foot bag.

Those skilled in the art will likely conceive of numerous modifications and variations of the illustrated embodiment without departing from the intended scope of the invention. The invention is accordingly defined by the claims appended hereto.

The invention claimed is:

1. A combination bagging machine and crop material storage bag to be filled by the machine comprising:

a bagging machine including a materials receiving station, a material compacting tunnel and a material force feeding member, said compacting tunnel having an open rear end configured to receive a storage bag having a gathered portion surrounding the rear end of the tunnel and a portion deployed from the tunnel rear end, said feed member, tunnel and bag in combination forcing and directing material from the receiving station into and through the tunnel and into a bag portion previously deployed from the said rear end, with additional bag portions being deployed from the said rear end, with additional bag portions being deployed from the tunnel rear end as the previously deployed bag portion is filled to capacity;

said tunnel rear end having a determined circumference and said bag having a similar circumference whereby material compressed in the tunnel is transferred to the bag in a similar compressed state;

said tunnel having a bottom portion and a first top portion which is releasably securable to said bottom portion and which first top portion and said bottom portion define a first tunnel rear end having a first circumference mated to a circumference of a first bag size, and said tunnel having a second top portion that is releasably securable to said bottom portion and which second top portion and said bottom portion together define a second tunnel rear end having a second circumference mated to a circumference of a second bag size.

2. A combination as defined in claim 1 wherein said first, and second bag sizes are standard bag sizes for fitting onto standard first and second tunnel rear end circumferences.

3. A combination as defined in claim 2 wherein the first tunnel top portion when secured to said bottom tunnel portion is configured to be similar to said standard first tunnel end circumference, and said second tunnel top portion is configured to mate with said bottom tunnel portion and having a tunnel end circumference that is lesser or greater than said first tunnel top portion by the difference in circumferential opening of the first and second bag sizes.

4. A combination as defined in claim 3 wherein the bottom and top tunnel portions have top and bottom edges, respectively that are superimposed one on the other and fastened together in said superimposed relation.

* * * * *